United States Patent [19]

Eubank

[11] Patent Number: 4,457,298
[45] Date of Patent: Jul. 3, 1984

[54] SOLAR HEATING DEVICE

[76] Inventor: William R. Eubank, Rte. 3, Box 236M, Bartlesville, Okla. 74003

[21] Appl. No.: 384,886

[22] Filed: Jun. 4, 1982

[51] Int. Cl.³ .............................................. F24J 3/02
[52] U.S. Cl. .................................. 126/429; 126/449; 126/450; 165/47; 165/72
[58] Field of Search .............. 126/429, 417, 449, 450; 165/72, 77, 41, 47, 53

[56] References Cited

U.S. PATENT DOCUMENTS

| | | | |
|---|---|---|---|
| 4,029,258 | 6/1977 | Groth | 126/429 |
| 4,059,226 | 11/1977 | Atkinson | 126/429 |
| 4,061,129 | 12/1977 | Wilson | 126/429 |
| 4,100,914 | 7/1978 | Williams | 126/429 |
| 4,112,919 | 9/1978 | Davis | 126/429 |
| 4,121,764 | 10/1978 | Hope | 126/429 |
| 4,135,491 | 1/1979 | Koizumi | 126/429 |
| 4,141,337 | 2/1979 | Bergen | 126/429 |
| 4,175,541 | 11/1979 | Midgley | 126/429 |
| 4,201,188 | 5/1980 | Cummings | 126/429 |
| 4,248,212 | 2/1981 | Stevens | 126/449 |
| 4,282,860 | 8/1981 | Koizumi | 126/429 |
| 4,302,942 | 12/1981 | Charters | 126/133 |
| 4,314,548 | 2/1982 | Hansom | 126/450 |
| 4,324,229 | 4/1982 | Risser | 126/450 |
| 4,327,795 | 5/1982 | Wheeler | 126/429 |
| 4,388,917 | 6/1983 | Shea | 126/450 |

Primary Examiner—Daniel J. O'Connor
Attorney, Agent, or Firm—Head, Johnson & Stevenson

[57] ABSTRACT

A modular solar heating device particularly designed and constructed for installation at the base of a mobile home, and comprising a support housing of a substantially triangular cross sectional configuration for supporting a light transmitting cover in an angular orientation with respect to the horizontal for transmitting energy from the sun to a heating plate disposed within the housing in spaced and substantially parallel planar relation with respect to the cover. A cool air receiving chamber is provided below the heating plate and in communication with a cold air return vent within the interior of the home for receiving cooled air therefrom. A hot air chamber is provided between the heating plate and the cover due to a greenhouse effect, and an air passageway provides communication between the cool air receiving chamber and the hot air chamber. The hot air chamber is in open communication with warm air vents provided in the interior of the housing whereby the heated air may be discharged into the room for heating thereof. A blower may be provided for facilitating the circulation of the air to and from the interior of the home and through the solar heating device.

1 Claim, 6 Drawing Figures

SOLAR HEATING DEVICE

BACKGROUND OF THE INVENTION

1. Field of the Invention

This invention relates to improvements in solar heating devices and more particularly, but not by way of limitation, to a solar heating device for use with mobile homes, and the like.

2. Description of the Prior Art

The economy and energy conservation properties of solar heating devices is well known, and there is much activity in the industry for improving the efficiency and practical aspects of these devices. There are many types of construction wherein the application of solar heating units has been inadequate, such as a mobile home, or the like. These buildings are increasing in use as a permanent home due to the economy in the housing market, and the need for economical heating in the mobile home industry is great. The overall external dimensions of these homes vary greatly, of course, some being relatively small, while others have reached such sizes that the mobility thereof is almost non-existent. As a result, it appears that some type of modular solar equipment would lend itself to use in combination with mobile home construction, particularly since there is usually considerable usable space beneath the mobile home and above the surface of the ground upon which the mobile home is situated.

There have been many patents directed to solar heating apparatus for generally similar purposes, such as residential use, and the like. For example, the Harder U.S. Pat. No. 4,296,741 issued Oct. 27, 1981, and entitled "Solar Energy Collecting Panel Assembly" discloses a solar energy collecting panel including a cover constructed of a high light transmission sheet material orientated in the direction of the sun, and a plurality of side-by-side solar energy collector plate members disposed on a blanket beneath the sheet to direct heated air toward a discharge pipe. A blower carries the hot or heated air from the discharge pipe into the interior of a room, or the like, and the cool air is withdrawn from the room and returned to the area of the blanket through an inlet pipe.

The Hanson U.S. Pat. No. 4,314,548, issued Feb. 9, 1982, and entitled "Solar Collector" shows a solar collector having an angularly disposed plastic bag wrapped around a heat absorbing panel. A corrugated element is disposed beneath the heat absorbing panel and directs the heated air upwardly toward a flexible duct which is connected with an air exhaust manifold. The hot air is drawn into a room by a fan and the cold air is returned through an air inlet and duct. The Ryan et al U.S. Pat. No. 4,278,072, issued July 14, 1981, and entitled "Forced Air Solar Heating System" shows a plurality of solar heating modules disposed in an end-to-end relation with the partitions interposed therebetween being ported for transmitting the hot air between the adjacent units.

Other U.S. patents generally relating to solar heating apparatus of a type as hereinbefore set forth are Morse U.S. Pat. No. 246,626, issued Sept. 6, 1881, and entitled "Warming and Ventilating Apartments by the Sun's Rays;" Keyes et al U.S. Pat. No. 3,984,685, issued July 15, 1975, and entitled "Solar Heating System;" Keyes et al U.S. Pat. No. 3,946,720, issued Mar. 30, 1976, and entitled "Solar Heat Collector;" Keyes et al U.S. Pat. No. 3,946,721, issued Mar. 30, 1976, and entitled "Method of Collecting and Storing Solar Heat;" O'Hanlon U.S. Pat. No. 3,964,678, issued June 22, 1976, and entitled "Solar Air Conditioner;" Cook U.S. Pat. No. 4,046,133, issued Sept. 6, 1977, and entitled "Solar Panel Assembly for Fluid Heating and Method;" Grisbrook U.S. Pat. No. 4,121,565, issued Oct. 24, 1978, and entitled "Solar Heating Unit;" Olsen U.S. Pat. No. 4,300,532, issued Nov. 17, 1981, and entitled "Method and Apparatus for Collecting Solar Energy;" Fodor U.S. Pat. No. 4,316,449, issued Feb. 23, 1982, and entitled "Solar Heater;" and Levine U.S. Pat. No. 4,316,452, issued Feb. 23, 1982, and entitled "Solar Collector." All of these devices have certain disadvantages, however, and are particularly disadvantageous for use in combination with a mobile hometype structure in that many are of a relatively complicated construction, and are relatively expensive and difficult to install in such an installation.

SUMMARY OF THE INVENTION

The present invention contemplates a novel solar heating apparatus, which may be referred to as a solar skirt, for ready installation and use with a mobile home, and thus overcomes the foregoing disadvantages. The novel device comprises one or more solar modules particularly adapted to be installed at the base of a mobile home, and substantially any desired number of the modules may be installed in end-to-end relation as required for heating of the interior of the home. Each module comprises a base member having a pair of oppositely disposed substantially triangular side walls extending upwardly therefrom. The sidewalls are preferably provided with a plurality of spaced ports providing communication between the interior of adjacent modules, it being understood that the outermost wall of the outermost modules is of a solid construction (the ports being eliminated) for precluding loss of heat therefrom. A back panel is secured between the sidewalls and extends upwardly from the base member. The top of each module is preferably provided with a relatively narrow planar portion extending between the end walls and secured to the upper edge of the back panel.

A heating panel constructed from corrugated metal, or the like, is hingedly secured to the back panel, and the rear edge of the heating panel is spaced below the narrow planar portion for directing heated air in the direction of the planar portion. In the normal operating position of the heating panel, the plane thereof is angularly disposed with respect to the horizontal, and the forward edge thereof is spaced slightly upwardly from the base plate to provide a flow passageway for movement of air during use of the solar module. The forward edge of the heating panel is supported at each end by shoulder means provided on the inner surfaces of the end walls. A transparent cover member is hingedly secured to the outer edge of the narrow planarportion and is movable between a lowered position supported by the outer edges of the end walls to a raised position providing access to the interior of the solar module. In the closed or lowered position of the cover member, a greenhouse effect is achieved for the interior of the solar module.

The back plate is provided with a plurality of cold air intake ports in the general proximity of the base and below the rear edge of the heating panel. In addition, a hot air exhaust chamber is in open communication with the interior of the solar module above the heating panel for directing the heated air from the interior of the module to a hot air vent in the room being serviced by the solar module. The cold air intake ports are in communication with a cold air return duct for receiving the cooled air from the interior of the room being serviced, thus providing a circulation of cooled air from the room and warm air into the room. Of course, it may be preferable to provide a suitable blower means between the cold air intake duct and the cold air intake ports of the solar module for a further efficient movement of the air during the heating operation. The novel solar module or modules are simple and efficient in operation and economical and durable in construction.

DETAILED DESCRIPTION OF THE PREFERRED EMBODIMENT

Figure 1:
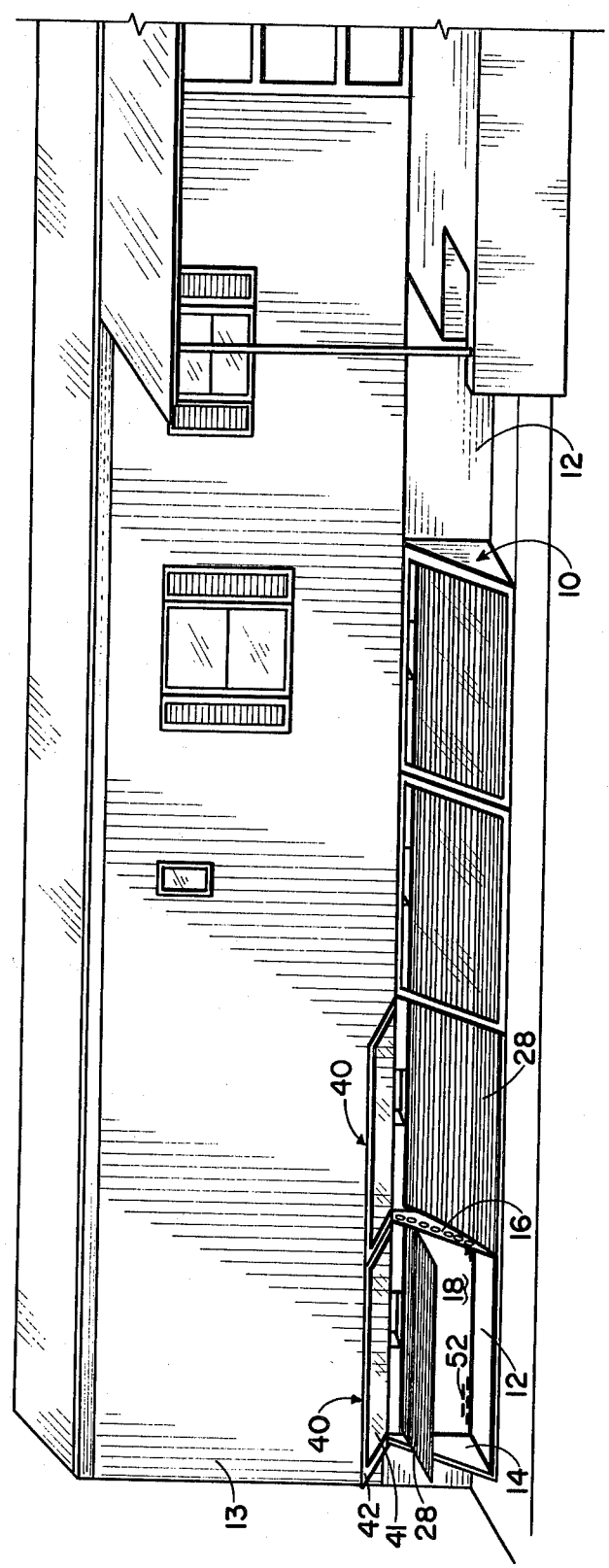
FIG. 1 is a perspective view of a plurality of solar modules embodying the invention disposed in end-to-end relation and installed for use in combination with a mobile home.

Referring to the drawings in detail, reference character 10 generally indicates a solar module adapted to be installed at the base 12 of a mobile home 13. The solar module 10 comprises a base plate 12 having a pair of substantially triangular end plates 14 and 16 secured to the opposite ends thereof in any suitable or well known manner, and extending substantially perpendicularly upward therefrom. A back plate 18 is secured to the rear edge of the base 12 and between the end plates 14 and 16. The leading or forward edge of the base member 12 is preferably provided with an angularly outwardly and downwardly extending flange 20 extending throughout the length thereof for supporting the base member 12 in an angular plane with respect to the horizontal, as particularly shown in FIG. 5. In addition, a relatively narrow top plate 22 is secured to the top edge of the back plate 18 and between the upper ends of the side plates 14 and 16. An angular outwardly and downwardly extending flange 24 (FIG. 5) is provided along the leading or forward edge of the top plate 22, with the outer surface of the flange 24 being in substantial planar alignment with the outer surface of the flange 20 for a purpose as will be hereinafter set forth.

The inner surface of each end plate 14 and 16 is provided with an inwardly directed support bracket or shoulder 26 (only one of which is shown in the drawings) for receiving a heating plate 28 thereagainst in the lowermost position of the heating plate. The heating plate 28 is preferably constructed from a corrugated metallic material, or the like, with the corrugations thereof extending longitudinally between the end plates 14 and 16 as particularly shown in FIGS. 2 through 4. The rearward edge of the heating plate 28 is hingedly secured to the inner surface of the back plate 18 in any suitable manner, such as by hinge means 30 (FIG. 5) whereby the heating plate 28 may be moved between raised and lowered positions therefor with respect to the shoulders 26. The hinge means 30 is secured to the back plate 18 in spaced relation with respect to the top plate 22 and preferably substantially adjacent to or in the proximity of a hot air chamber 32 in open communication with a port 34 provided substantially in the center of the upper portion of the back plate 18. The forward or leading edge of the heating plate 28 rests on a pair of spaced oppositely disposed brackets 36 (only one of which is shown) secured to the base plate 12. In this manner, the leading edge of the heating plate 28 is supported in spaced relation with respect to the base plate 12 when the heating plate is in the lowered position thereof. Thus, an air passageway 38 is provided along the forward edge of the base plate 12.

A cover member 40 is provided for the solar module 10 and comprises a central portion 41 constructed of a suitable light transmitting or transparent material, such as glass, plastic, or the like, and secured within a suitable outer frame member 42. The frame 42 has one longitudinal edge hingedly secured to the flange 24 and the transverse edges thereof adapted to rest on the forward edges of the side plates 14 and 16 in the lowered position of the cover 14. The second longitudinal edge of the frame 42 rests on the flange 20 in the lowered position of the cover 40 and it is preferable to interpose a suitable sealing gasket 44 between the frame 42 and the supporting surfaces therefor. In addition, the frame may be removably secured in the lowermost position thereof by suitable wing nuts 46 and complementary threaded studs or screws 48. The cover 40 is supported substantially parallel to and in spaced relation with respect to the heating plate 28 in the lowered positions of each, thus providing a a chamber 50 between the cover and heating plate for a purpose as will be hereinafter set forth.

A plurality of cold air intake ports or apertures 52 are provided in the lower portion of the back plate 18 and open to a chamber 54 provided between the bottom plate 12 and the heating plate 28 in the lowered position of the plate 28. Each of the ports 52 are preferably in open communication with suitable duct means 56 extending rearwardly from the back plate 18 as particularly shown in FIG. 5. The duct means 56 is in communication with any suitable cold air return vent 58 (FIG. 6) in any suitable manner, such as by a flexible conduit means, or the like (not shown). In addition, the hot air chamber 32 is in communication with a suitable warm air vent 60 (FIG. 6) in any well known manner, such as by flexible conduits 61, or the like. Furthermore, it may be desirable or preferable to install a suitable blower 62 in the proximity of the cold air return vent 56 for facilitating the movement of air through the apparatus 10 as will be hereinafter set forth.

The vents 58 and 60 may be provided within the interior of the mobile home 14 in the usual or normal manner for circulating warm air into the interior thereof and discharging cool air therefrom for recirculation through a module 10, or a battery of the modules, as desired.

Figure 5:
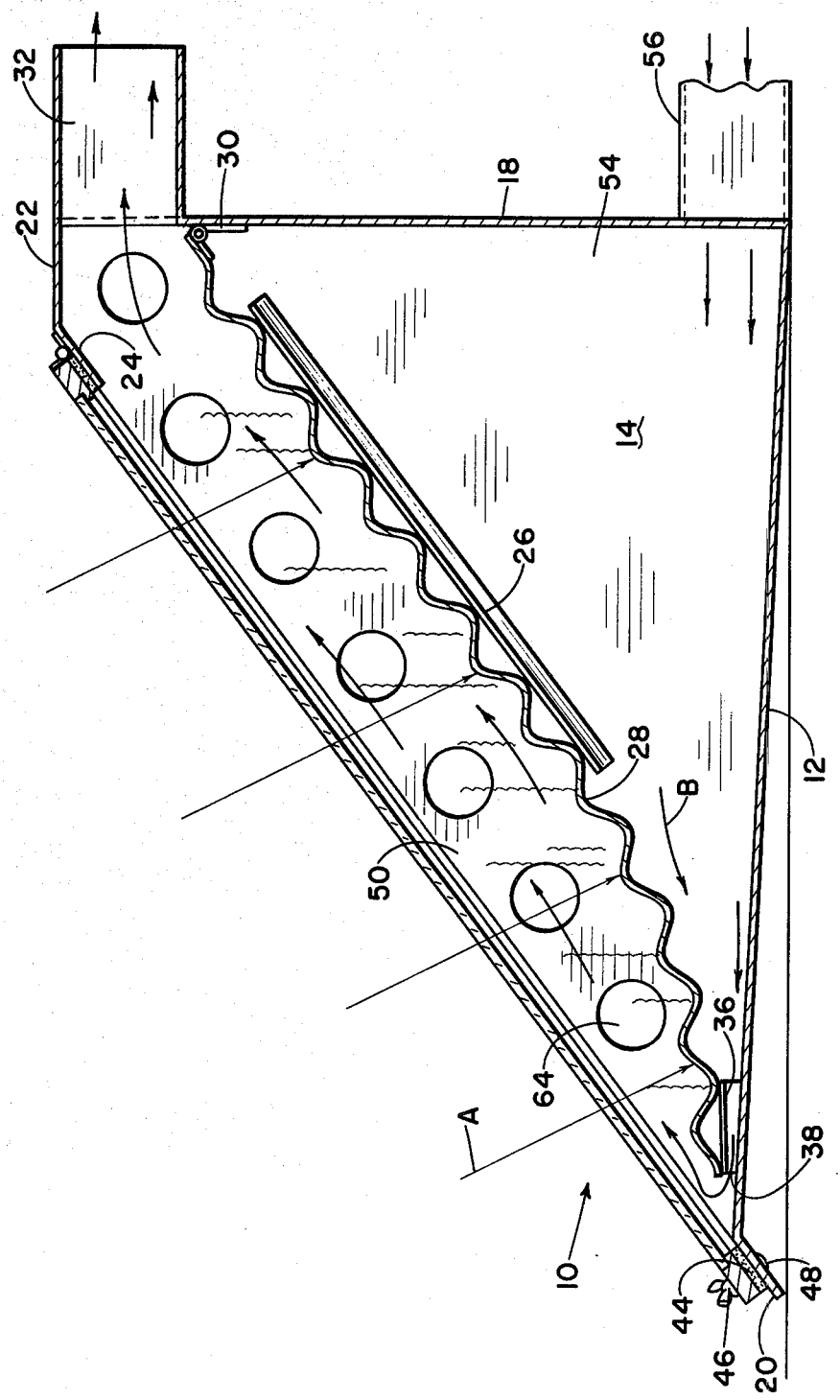
FIG. 5 is a view taken on line 5—5 of FIG. 2.

Referring now to FIG. 5, the operation of the solar module 10 is normally accomplished when the heating plate 28 and cover 40 are both in the lowered position thereof as shown in FIG. 5. During hours of sunshine, the sun's rays pass through the transparent central portion 41 of the cover 40 as indicated by the arrows A, and impinge on the outer surface of the heating plate 28. This raises the temperature of the heating plate 28 sufficiently to heat the air present in the chamber 50, and as a result, the natural reaction occurs wherein the warm air rises within the chamber 50 for movement into and through the warm air chamber 32. The cool air in the chamber 54 is thus drawn through the chamber 54 and the passageway 38 and into the chamber 50 as indicated by the arrows B where it is heated as it continues to move upwardly through the chamber 50 and over the surface of the heating plate 28 for discharge from the module 10 through the chamber 32. The warm or hot air leaving the module 10 through the hot air chamber 32 is directed into the interior of the mobile home 13 through the heating vent or vents 60, thus supply heat for the home 13. Of course, the same natural reaction occurs within the interior of the home 14 whereby the cool air falls to the lower portions of the interior thereof for withdrawal through the cold air return vents or vents 62. The cold air is recirculated into the chamber 54 of the module 10 through the cold air intake ports 52. Of course, the blower or fan 58 may be utilized, if desired, for increasing the efficiency of the air movement to, through and from the module or modules 10, as desired.

Figure 2:
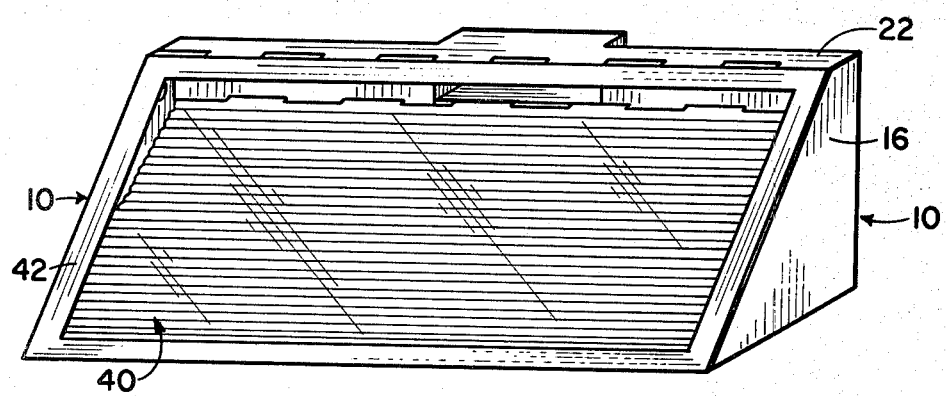
FIG. 2 is a perspective view of a solar module embodying the invention, and illustrated in the normal heating operational position therefor.
Figure 3:
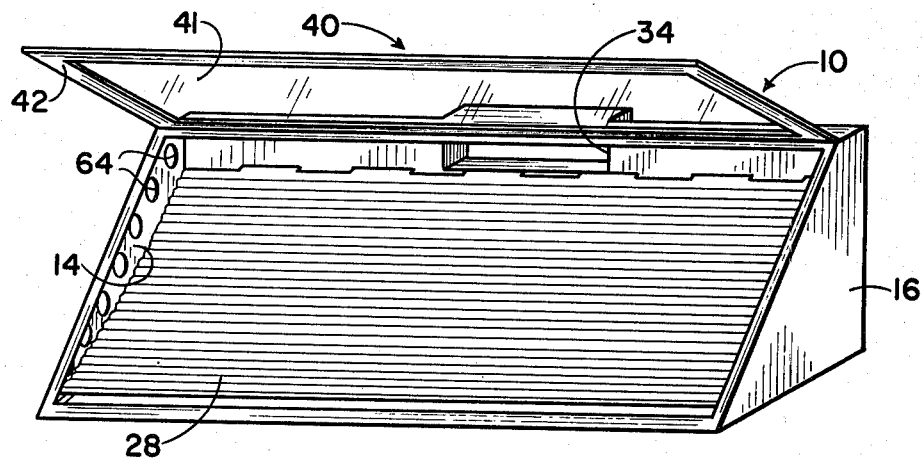
FIG. 3 is a view similar to FIG. 2 showing the solar module with the cover thereof in an open position.
Figure 4:
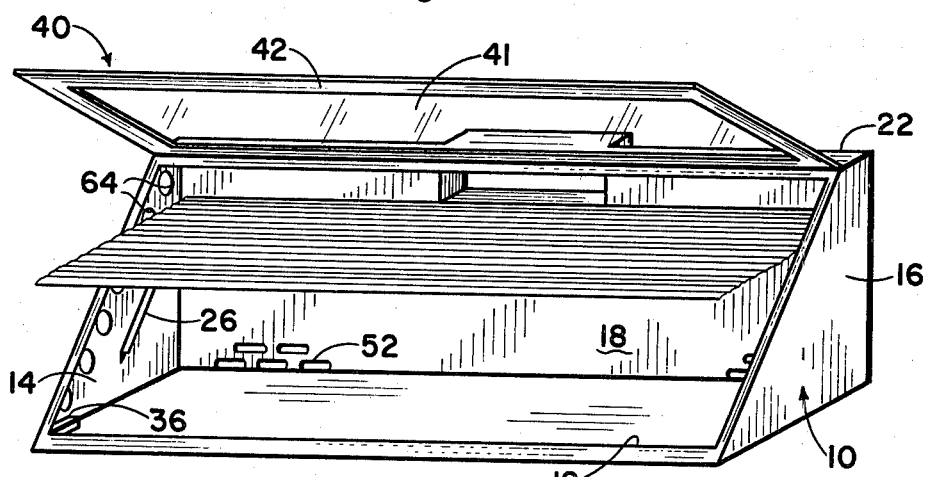
FIG. 4 is a view similar to FIG. 3 showing both the cover and heating panel thereof in an open position.

Referring now to FIGS. 2, 3 and 4, in the event it is necessary to provide access to the interior of the module 10, the wing nuts 46 may be removed in the usual manner, and the cover 40 may be pivoted about the hinged connection thereof and to an open position, as particularly shown in FIG. 3. This provides ready access to the heating plate 28. If it is necessary or desirable to provide access to the chamber 54, the heating plate 28 may be manually pivoted about the hinge means 30 and to the upper or raised position therefor, as particularly shown in FIG. 4. This provides ready access to the chamber 54.

Figure 6:
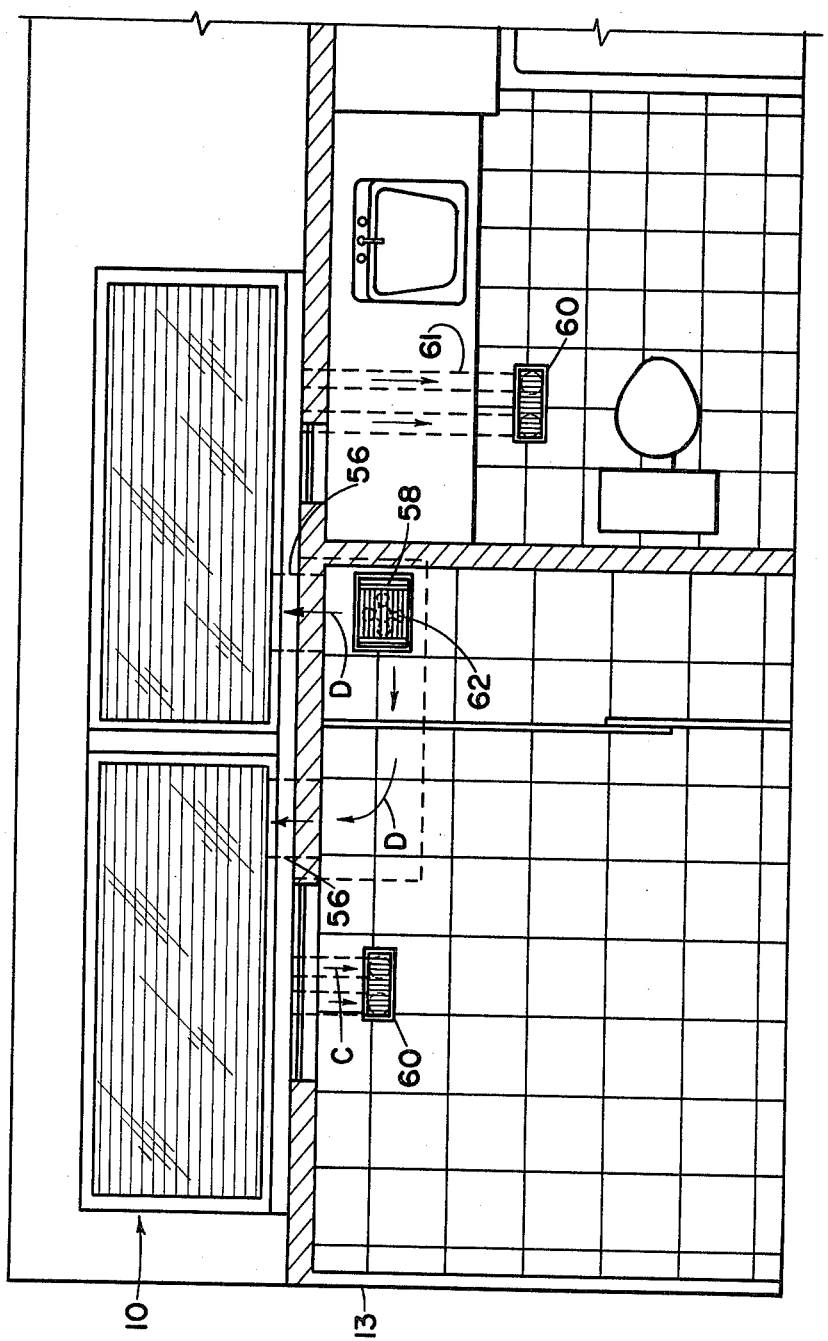
FIG. 6 is a plan view of a portion of a floor plan of a typical mobile home illustrating the relationship between solar modules embodying the invention and intake and outlet vents in the interior of the mobile home.

As shown in FIG. 1, substantially any number of the modules 10 may be disposed in end-to-end relationship and preferably installed at the base 12 of the mobile home 13. It is preferable to provide a plurality of spaced apertures 64 in each of the end plates 14 and 16 of abutting pairs of the modules 10 in order to establish communication between the chamber 54 and 50 of the adjacent modules. Of course, it is to be understood that the outermost end plate of each of the outermost modules 10 will be of a solid construction (omitting the apertures 64) in order to preclude unwanted loss of air from the interior of the modules. Each of the modules 10 installed at the base 12 of the home 13 may be operably connected with independent or separate heating vents 60, as particularly shown in FIG. 6. That is, the hot air chamber 32 of each module 10 may be connected in communication with a vent 60 to supply warm or hot air to the interior of the home 13 surrounding the vent 60 as indicated by the arrows C in FIG. 6. Whereas each of the modules 10 may be operably connected with a separate or independent cold air return vent 62, it may be desired to operably connect a pair of adjacent modules 10 to a common return vent 62. That is the cold air duct 56 of each of said adjacent modules 10 may be in open communication with a single return air vent 62 as shown in FIG. 6 whereby the cool or cold air may be returned from the interior of the house 13 to the chamber 54 through the ducts 56, as indicated by the arrows D.

From the foregoing it will be apparent that the present invention provides an economical and simple solar heating means particularly designed and constructed for installation at the base of a mobile home. The novel solar heating means comprises one or more solar modules having a minimum of elements required for an efficient heating of air by use of the energy radiating from the sun. There are few moving parts to be maintained, and the source of energy is utilized in a natural manner for an effecting heating source for the mobile home at low use and maintenance costs since only an outer housing, a movable heating plate and a movable cover are required for each module.

Whereas the present invention has been described in particular relation to the drawings attached hereto, it should be understood that other and further modifications, apart from those shown or suggested herein may be made within the spirit and scope of this invention.

What is claimed is:

1. A modular solar heating apparatus comprising a housing, light transmitting cover means supported by the housing for admitting solar energy into the interior thereof, heating plate means disposed within the housing in spaced substantially parallel planar relation with respect to the cover means, a cold air receiving chamber provided beneath the heating plate means, a hot air chamber provided between the heating plate means and the cover means, said hot air being produced by a greenhouse effect created by the cover means and heating plate means, air passageway means interposed between the cold air chamber and the hot air chamber, cold air intake means provided in the cold air chamber for receiving a supply of cold air therethrough, and warm air discharge means provided in the hot air chamber for releasing the hot air therefrom, the housing being of a substantially triangular cross sectional configuration whereby the cover means is supported at an angular orientation with respect to the horizontal for receiving the sun's rays therethrough, and wherein the cover means is hingedly secured to the housing for movement between open and closed positions for providing access to the interior of the housing, the heating plate means being constructed of a corrugated metallic material and hingedly secured within the housing to provide access to the cold air receiving chamber, a plurality of modules disposed in end-to-end relationship, means providing communication between the interior of adjacent modules, the plurality of modules being installed at the base of a mobile home, and including first means operably connecting the cold air intake means with the interior of the mobile home, and second means operably connecting the warm air discharge means with the interior of the mobile home whereby the air may be circulated to and from the said interior of the mobile home whereby the air may be circulated to and from the said interior of the mobile home and through the modules, and including blower means in communication with the cold air intake means for facilitating movement of air through the apparatus.

* * * * *